United States Patent
Lopatin et al.

(10) Patent No.: US 6,800,241 B2
(45) Date of Patent: Oct. 5, 2004

(54) PROCESS FOR PRODUCING DIELECTRIC COMPONENT

(75) Inventors: Sergej Lopatin, Lörrach (RU); Rolf Schwald, Schopfheim (DE); Alexander Hardell, Lörrach (DE)

(73) Assignee: Endress + Hauser GmbH + Co., Maulberg (DE)

( * ) Notice: Subject to any disclaimer, the term of this patent is extended or adjusted under 35 U.S.C. 154(b) by 234 days.

(21) Appl. No.: 10/125,986

(22) Filed: Apr. 19, 2002

(65) Prior Publication Data

US 2002/0115776 A1 Aug. 22, 2002

Related U.S. Application Data

(62) Division of application No. 09/200,014, filed on Nov. 25, 1998, now Pat. No. 6,417,748.

(30) Foreign Application Priority Data

Dec. 10, 1997 (EP) .............................................. 97121718

(51) Int. Cl.$^7$ ................................................. B28B 3/00
(52) U.S. Cl. ........................................ 264/642; 264/125
(58) Field of Search ................................ 264/614, 642, 264/112, 122, 125

(56) References Cited

U.S. PATENT DOCUMENTS 3,908,038 A * 9/1975 Nienart et al. .............. 427/485
4,335,180 A 6/1982 Traut
4,613,540 A 9/1986 Traut et al.
4,778,649 A * 10/1988 Niino et al. .................... 419/9
5,227,749 A 7/1993 Raguenet et al.
5,358,775 A 10/1994 Horn, III

FOREIGN PATENT DOCUMENTS

DE      44 05 855     8/1995
GB       2061 989     5/1981

* cited by examiner

*Primary Examiner*—Christopher A. Fiorilla
(74) *Attorney, Agent, or Firm*—Bose McKinney & Evans LLP

(57) ABSTRACT

A description is given of a filling level measuring device operating with microwaves, having a housing and an insert composed of a dielectric, and of a process for producing the dielectric, in which the dielectric constant of the insert is adjustable and in which the insert has a high chemical resistance and a mechanical strength adequate for industrial applications. The dielectric is a composite material composed of a fluoroplastic, in particular polytetrafluoroethylene, and ceramic and is produced by mixing powdered ceramic and powdered fluoroplastic, drying the mixture, pressing the mixture and sintering the pressed mixture.

6 Claims, 2 Drawing Sheets

PROCESS FOR PRODUCING DIELECTRIC COMPONENT

CROSS-REFERENCE TO RELATED APPLICATIONS

This is a divisional application of U.S. patent application Ser. No. 09/200,014, filed Nov. 25, 1998 now U.S. Pat. 6,417,748 which is expressly incorporated herein by reference. The invention relates to a filling level measuring device operating with microwaves, having a metallic housing portion through which microwaves are transmitted and/or received and in which an insert composed of a dielectric is arranged. Furthermore, the invention relates to a process for producing the dielectric.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

In filling level measurement, microwaves are sent by means of an antenna to the surface of a filled substance and the echo waves reflected at the surface are received. An echo function representing the echo amplitudes as a function of the distance is formed and used to determine the probable useful echo and its delay time. The delay time is used to determine the distance between the surface of the filled substance and the antenna.

All known methods which make it possible to measure relatively short distances by means of reflected microwaves can be used. The most well-known examples are pulsed radar and frequency-modulation continuous-wave radar (FMCW radar).

In the case of pulsed radar, short microwave transmission pulses referred to in the following as wave packets, are transmitted periodically, reflected by the surface of the filled substance and received again after a distance-dependent delay time. The received signal amplitude as a function of time represents the echo function. Each value of this echo function corresponds to the amplitude of an echo reflected at a particular distance from the antenna.

In the case of the FMCW method, a continuous microwave which is periodically frequency-modulated linearly, for example on the basis of a sawtooth function, is transmitted. The frequency of the received echo signal therefore has with respect to the instantaneous frequency which the transmitted signal has at the instant of reception a frequency difference which depends on the delay time of the echo signal. The frequency difference between transmitted signal and received signal, which can be obtained by mixing the two signals and evaluation of the Fourier spectrum of the mixed signal, consequently corresponds to the distance of the reflecting surface from the antenna. Furthermore, the amplitudes of the spectral lines of the frequency spectrum obtained by Fourier transformation correspond to the echo amplitudes. Therefore, in this case, this Fourier spectrum represents the echo function.

Filling level measuring devices operating with microwaves are used in very many branches of industry, for example in chemistry or in the food industry. Typically, the filling level in a container is to be measured. These containers generally have an opening, at which a connection piece or a flange is provided for the fastening of measuring devices.

In industrial measuring technology, dielectric rod antennas and horn antennas are regularly used for transmitting and/or receiving. Typically, a pot-like housing which has the geometry of a short-circuited waveguide is used. An exciter pin, via which microwaves are transmitted and/or received through the housing, is inserted into said housing. In the case of a horn antenna, the housing is adjoined by a funnel-shaped portion which opens out in the direction facing the container and forms the horn. In the case of the rod antenna, a rod composed of a dielectric and pointing into the container is provided. The interior space of the housing is usually filled virtually completely by an insert composed of a dielectric. In the case of the horn antenna, the insert has a conical end, pointing into the container. In the case of rod antennas, the insert is adjoined by the rod-shaped antenna.

On account of the dimensioning of the waveguide and the dielectric constant of the insert, only certain modes can be propagated. For filling level measurements, modes having a radiation characteristic with a pronounced forward lobe are preferred, in the case of circular waveguides, for example, the transverse electric (TE-11) mode. The transmission frequency is also prescribed in most countries.

In order that the dimensions of the housing are nevertheless variable within certain limits, for example to perform adaptations to dimensions of containers, a dielectric with a substantially continuously adjustable dielectric constant is advantageous. In the following text, dielectric constant always refers to the dielectric constant which is based on the vacuum dielectric constant and the value of which is equal to the quotient of the dielectric constant divided by the vacuum dielectric constant.

In DE-A 44 05 855 there is described a filling level measuring device operating with microwaves having a metallic housing portion, through which microwaves are transmitted and/or received and in which an insert composed of a dielectric is arranged.

It has a rod antenna and the insert and rod antenna are composed of a dielectric. It is specified to use plastic, glass or ceramic or a mixture of said materials for this purpose.

Insert can come into contact with a medium located in the container. Depending on the application, this may well be an aggressive medium. Consequently, the insert should have in addition to the mechanical resistance required for industrial applications also a high chemical resistance.

In the case of commercially available filling level measuring devices operating with microwaves, polytetrafluoroethylene (PTFE), which has a high chemical resistance, is often used for this reason. The dielectric constant of polytetrafluoroethylene (PTFE) is not variable, however.

In U.S. Pat. No. 5,227,749 microwave circuits and components are described, for example microwave striplines, in which desired electrical and mechanical properties are achieved simultaneously by using an enclosure filled with a dielectric. The enclosure offers adequate mechanical stability, so that the dielectric can be selected purely on the basis of its dielectric properties.

Although such a construction represents a feasible approach in the case of microwave striplines and microwave circuits, it is unsuitable however for use in an antenna. The housing and insert act as a waveguide in which the microwaves form. An enclosure would have different dielectric properties than the dielectric embedded in it and, owing to its nonisotropic electrical properties, would consequently lead to considerable disturbances in the desired modes during transmitting and/or receiving.

In U.S. Pat. No. 4,335,180 there is described a dielectric for microwave circuit boards and a method of making it.

The dielectric consists of polytetrafluoroethylene (PTFE), a filler material and a fibrous material. The proportion of filler material is specified as 10 to 75 percent by weight. Among the materials specified as the filler material is aluminum oxide. The proportion of fibers is between 2.5 and 7 percent by weight of the dielectric and ensures its mechanical stability. The dielectric constant of the material is specified as 10 to 11.

This dielectric is made by blending the filler material and fibrous material into a polymer dispersion. A flocculant is added to the slurry thus formed until a dough-like material is produced, which is then shaped and dried.

In a circuit board, the fibers can be aligned in a plane by appropriate processing, for example pressing or rolling, so that a substantially homogeneous thin sheet, that is a substantially two-dimensional formation, is produced. A three-dimensional body cannot be readily produced in this way, however. In a three-dimensional body, fibers cannot be aligned in one plane by pressing or rolling. Raised fibers behave like small quills and the body remains correspondingly porous and inhomogeneous in spite of pressing. It would consequently have less mechanical strength and inhomogeneties would lead to reflections of the microwaves. There is also the risk of the porous material being saturated with moisture. Moisture in the material leads to a high loss factor tan $\delta$.

BRIEF SUMMARY OF THE INVENTION

It is an object of the invention to specify a filling level measuring device operating with microwaves, having a housing and an insert composed of a dielectric, and a process for producing the dielectric, in which the dielectric constant of the insert is adjustable and in which the insert has a high chemical resistance and a mechanical strength adequate for industrial applications.

For this purpose, the invention comprises a filling level measuring device operating with microwaves having a metallic housing portion, through which microwaves are transmitted and/or received and in which there is arranged an insert composed of a dielectric, which consists of a composite material composed of a fluoroplastic, in particular polytetrafluoroethylene (PTFE), and ceramic.

According to an advantageous refinement, the composite material has a proportion of ceramic which is below the percolation limit.

According to a further refinement, the composite material has a dielectric constant $\epsilon$ and the quotient of the dielectric constant $\epsilon$ and the vacuum dielectric constant $\epsilon_0$ has a value between 2 and 10. Furthermore, the composite material preferably has a loss factor tan $\delta$ which is less than one fiftieth.

According to an advantageous development, the insert has in a portion of the housing arranged in the direction of transmission a lower proportion of ceramic than in a portion facing away from the direction of transmission.

Furthermore, the invention includes a process for producing a composite material from fluoroplastic, in particular polytetrafluoroethylene (PTFE), and ceramic, which comprises the following steps:

a) producing a mixture of powdered ceramic and powdered fluoroplastic, b) drying the mixture, c) pressing the mixture and d) sintering the pressed mixture.

According to an advantageous refinement of the process, the proportion of ceramic in the mixture is below the percolation limit.

According to a further refinement of the process, the quotient of the dielectric constant $\epsilon$ of the composite material and the vacuum dielectric constant $\epsilon_0$ has a value between 2 and 10 and the composite material has a loss factor of tan $\delta$ which is less than one fiftieth.

According to a further refinement of the process, two or more mixtures with different proportions of ceramic are produced, and the mixtures are layered one on top of the other before pressing in such a way that the proportion of ceramic in the composite material decreases from layer to layer.

The invention and further advantages are now explained in more detail with reference to the figures of the drawing, in which two exemplary embodiments of a filling level measuring device operating with microwaves are represented; identical parts are provided in the figures with identical reference numbers.

DETAILED DESCRIPTION OF THE INVENTION

Figure 1:
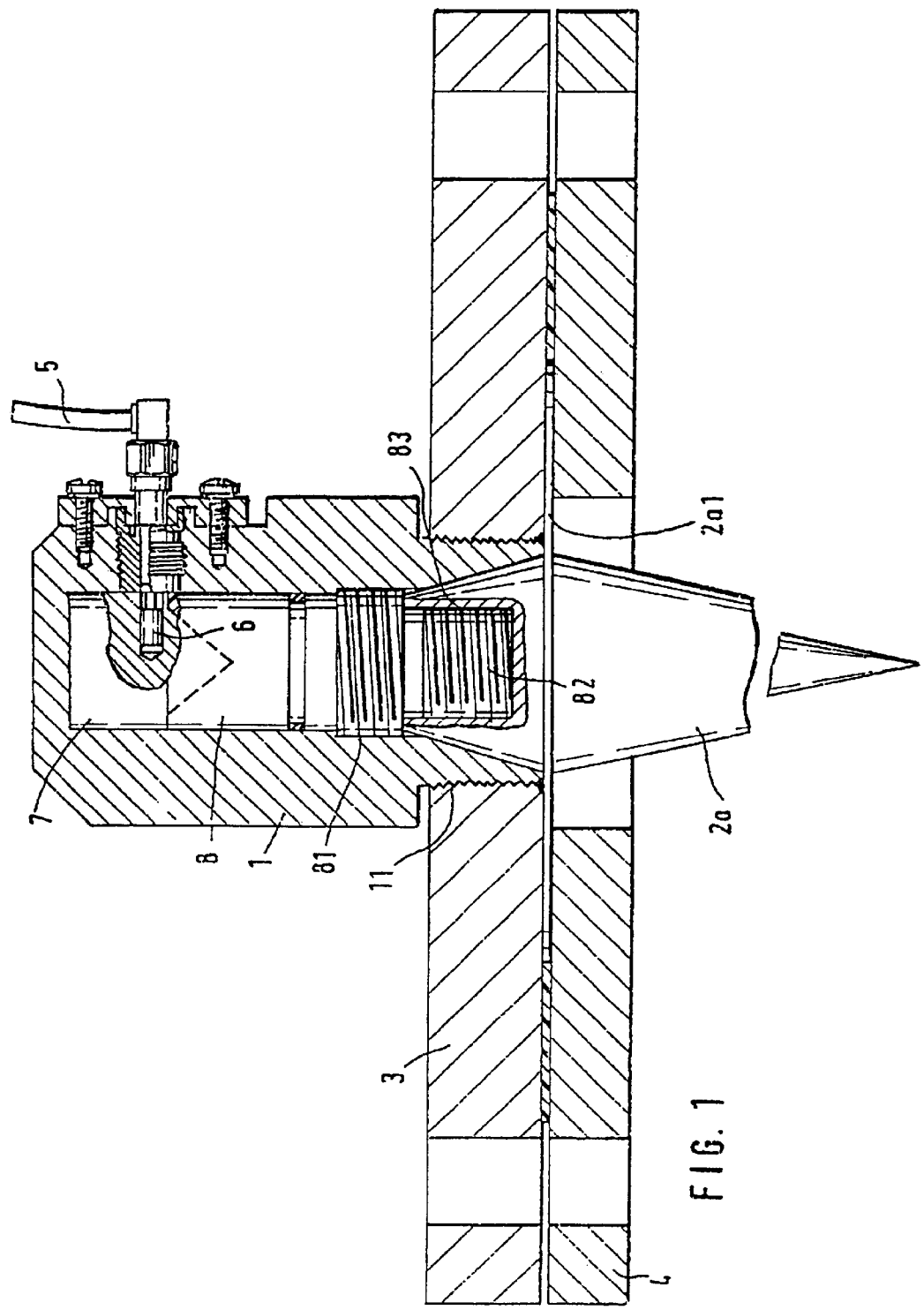
FIG. 1 shows a longitudinal section through a first exemplary embodiment of a filling level measuring device operating with microwaves.
Figure 2:
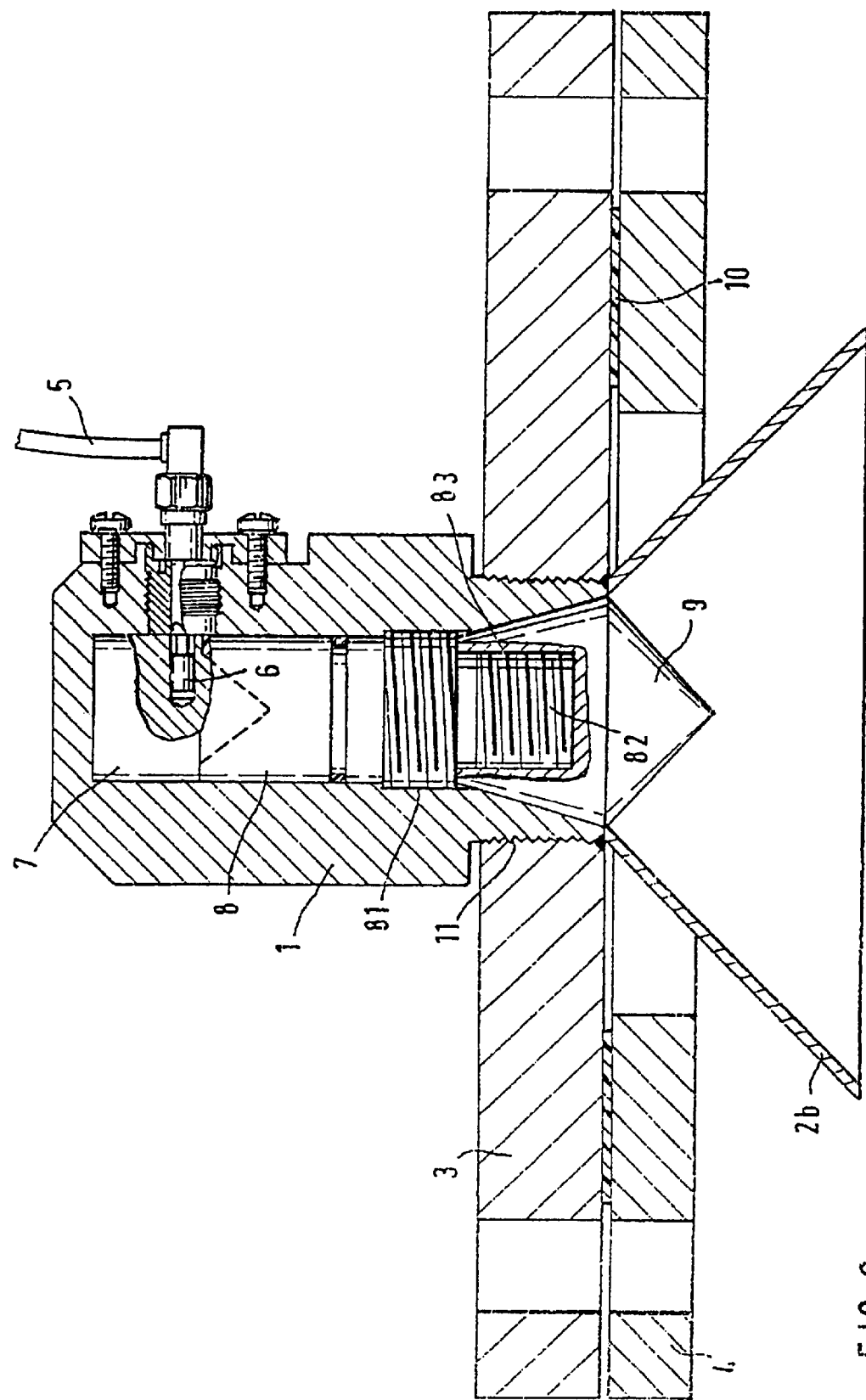
FIG. 2 shows a longitudinal section through a second exemplary embodiment of a filling level measuring device operating with microwaves.

In FIGS. 1 and 2, a longitudinal section through a filling level measuring device 1 operating with microwaves and to be fastened on a container is diagrammatically represented in each case. In the container, not represented in the figures, there is a medium and the filling level measuring device 1 serves the purpose of determining the filling level of this medium in the container. To this end, in the case of the exemplary embodiment of FIG. 1, microwaves are transmitted into the container via a rod-shaped antenna 2a, pointing into the container, and the echo waves reflected at the surface of the filled substance are received.

In the case of the exemplary embodiment represented in FIG. 2, a horn antenna is provided. The latter has a funnel-shaped horn 2b made of a metal, in particular a high-grade steel, which opens out in the direction facing the container.

In both exemplary embodiments, the measuring device has in each case a cylindrical housing 1. In the case of the exemplary embodiment of FIG. 1, the housing 1 is provided with an external thread 11, by means of which it is screwed into a flange 3. The latter is mounted on the container on a corresponding counter-flange 4. In the case of the exemplary embodiment of FIG. 2, the housing 1 is likewise screwed into the flange 3. The horn 2b is screwed onto the flange 3 at a later time.

The housing 1 has the shape of a pot or of a tube closed off on one side at the end. The microwaves are generated by a microwave generator (not represented) and are fed via a coaxial line 5 to an exciter element 6, introduced laterally into the housing 1. It goes without saying that it is also possible to introduce the exciter element into the housing from one of the end faces. The microwave generator is, for example, a pulsed-radar device, an FMCW device or a continuously oscillating microwave oscillator.

The housing 1 consists of an electrically conductive material, for example aluminum or high-grade steel. The microwaves are transmitted and/or received through the housing 1 via the antenna 2a or 2b.

In the case of both exemplary embodiments, in the housing 1 there is arranged an end element 7, which completely fills an interior space of the housing 1 facing away from the container, apart from a recess which serves for receiving the exciter element 6. On the side facing the container, a cone is formed onto the end element 7. An interior space of the housing 1 adjoining said cone is filled by a substantially cylindrical insert 8. The insert has on its side facing the end element a recess which is identical in shaped to the cone. The insert 8 is screwed into the housing 1 by means of a thread 81.

In the direction facing the container, there is formed onto the insert 8 a portion 82 of smaller external diameter. this portion has an external thread 83. In the case of the exemplary embodiment of FIG. 1, the rod-shaped antenna 2a is screwed onto this external thread 83. For this purpose, the antenna 2a has a correspondingly shaped recess, provided with an internal thread. In the case of the exemplary embodiment represented in FIG. 2, a conical end piece 9, pointing in the direction of the container, is screwed onto the portion 82.

The sealing of the container takes place in the case of the exemplary embodiment of FIG. 1 by means of an annular disk 2a1, which extends radially outward, is formed onto the rod-shaped antenna 2a and is clamped between the flange 3 and the counter-flange 4. In the case of the exemplary embodiment of FIG. 2, an annular disk-shaped seal 10 is provided, which is likewise clamped between the flange 3 and the counter-flange 4.

The insert 8 consists of a dielectric, which is a composite material composed of a fluoroplastic and ceramic. A fluoroplastic is understood to mean a fluorine-containing polymer, i.e. a polymer with a high proportion of fluorine. The fluoroplastic is preferably polytetrafluoroethylene (PTFE). Likewise very well-suited are modifications of polytetrafluoroethylene (PTFE) in which polytetrafluoroethylene (PTFE) serves as the basic substance.

Examples of this are tetrafluoroethylenehexafluoroproplyene copolymer (FEP) and perfluoroalkoxy copolymer (PFA). The following description takes polytetrafluoroethylene (PTFE) as an example. This is not to be regarded as a restriction, however.

The end piece 7 likewise preferably consists of this material. In the case of a horn antenna as is represented in FIG. 2, the conical end piece 9 also preferably consists of this composite material.

The proportion of ceramic is preferably below the percolation limit. Below the percolation limit there is no continuous link between the particles of ceramic in the three spatial directions. Depending on the particle size, proportions of ceramic of up to 35 percent by volume are possible as a result.

This achieves the effect that the particles of ceramic are firmly embedded in the polytetrafluoroethylene (PTFE). The composite material consequently has a mechanical strength which substantially corresponds to the strength of polytetrafluoroethylene (PTFE). The material is homogeneous and has a low porosity.

The percolation limit depends on the size of the particles of the two components and can be determined experimentally by determining the dielectric constant or the resistivity of the material as a function of the proportion of ceramic. At the percolation limit, a distinct nonlinear increase in these parameters can be noted.

The ceramic is preferably an aluminum oxide ($Al_2O_3$), for example corundum. However, barium titanate ($BaTi_4O_9$), calcium titanate ($CaTiO_3$) or aluminosilicates can also be used.

The dielectric constant of aluminum oxide ($Al_2O_3$) has a value of approximately $\epsilon/\epsilon_0 \cong 7$; in the case of barium titanate ($BaTi_4O_9$), this value is $\epsilon/\epsilon_0 \cong 50$ and in the case of calcium titanate (CaTiO3) a value of $\epsilon/\epsilon_0 \cong 40$ to 60 can be obtained. Polytetrafluoroethylene (PTFE) has a dielectric constant of $\epsilon/\epsilon_0 \cong 2$.

The percolation limit for composite material composed of polytetrafluoroethylene and ceramic is at a proportion by volume of about 33% ceramic if the size of the particles of the two components, ceramic and polytetrafluoroethylene (PTFE), is approximately the same.

The dielectric constant of the composite material can be determined to an approximation by linear interpolation. The dielectric constant of the composite material is consequently approximately equal to the weighted sum of the dielectric constants of polytetrafluoroethylene (PTFE) and ceramic, the weighting factors being equal to the proportions by volume V in percent by volume of the components $\epsilon/\epsilon_0$ (composite material)$\cong \epsilon/\epsilon_0$ (ceramic)*V(ceramic)+$\epsilon/\epsilon_0$ (PTFE)*V(PTFE)

The actual values of the dielectric constant $\epsilon/\epsilon_0$ of the composite material with a proportion of ceramic below the percolation limit are slightly below the values determined by linear interpolation.

If aluminum oxide ($Al_2O_3$) is used, dielectric constants with values of $\epsilon/\epsilon_0 \cong 2$ to $\epsilon/\epsilon_0 \cong 5$ can be adjusted; if barium titanate ($BaTi_4O_9$) is used, the adjustable values lie between $\epsilon/\epsilon_0 \cong 2$ and $\epsilon/\epsilon_0 \cong 33$ and, if calcium titanate ($CaTiO_3$) is used, they lie between $\epsilon/\epsilon_0 \cong 2$ and $\epsilon/\epsilon_0 \cong 30$.

Preferably, the value for the dielectric constant $\epsilon/\epsilon_0$ lies between 2 and 10. As a result of the low dielectric constant, housings 1 with a relatively large internal diameter can be used.

In the case of a dielectric constant of $\epsilon/\epsilon_0 \cong 4$, an internal diameter of about 2 centimeters can be used for transmitting and/or receiving microwaves at a frequency of about 6 $GH_z$. This offers the advantage that inevitable production-related tolerances of the components have minor effects.

A further great advantage of the composite material is that, although it has approximately the mechanical strength of polytetrafluoroethylene (PTFE), the composite material nevertheless has a very much lower coefficient of thermal expansion than polytetrafluoroethylene (PTFE).

The coefficient of thermal expansion of polytetrafluoroethylene is about $150*10^{-6}$. The housings 1 typically consist of a high-grade steel. High-grade steel has a coefficient of thermal expansion of $17*10^{-6}$. The coefficient of thermal expansion of ceramic is of the same order of magnitude as the coefficient of thermal expansion of metal. The coefficient of thermal expansion of a composite material consequently will be much less than the coefficient of thermal expansion of polytetrafluoroethylene (PTFE), according to its proportion of ceramic.

It is ensured by the proportion of ceramic that the insert 8 and housing 1 experience a comparable thermal expansion, so that very much lower temperature-dependant mechanical stresses occur in the housing 1. The composite material also has a lower pressure- and temperature-dependent tendency to flow than is the case with polytetrafluoroethylene (PTFE). The measuring device can be correspondingly used at higher temperatures and pressures. In comparison with the use of pure ceramic, the composite material additionally offers the advantage that, on account of the polytetrafluoroethylene (PTFE), it is not brittle. There is consequently the possibility of also using relatively large components, such as the rod-shaped antenna 2a, composed of this material. The use of a hard brittle antenna, for example of pure ceramic, would be problematical, since the antenna could break off under mechanical loading.

The composite material has a loss factor tan δ which is less than one fiftieth. It is ensured by the low loss factor that the microwave power loss is low.

In the case of a rod-shaped antenna 2a, as is represented in FIG. 1, it may be desired that the rod-shaped antenna 2a consists of polytetrafluoroethylene (PTFE). This is the case, for example, whenever a measuring device is to be equipped at a later time with an insert 8 composed of the composite material, for example, because the composite material has a more favorable dielectric constant or because the customer would like to use polytetrafluoroethylene (PTFE) exclusively in the container on account of the chemical properties of its filled substance.

To avoid mechanical stresses on account of the different coefficients of thermal expansion of the materials and deformations caused as a result, the insert 8 preferably has in a portion of the housing 1 arranged in the direction of transmission, here in the direction facing away from the antenna, a higher proportion of ceramic than in a portion arranged in the direction of transmission, here facing the antenna. There is consequently a virtually continuous transition, by means of which the advantages of the composite material can be utilized without sudden changes in impedance occurring, which would lead to reflections of microwaves and/or a greater loss factor tan δ.

A composite material composed of ceramic and fluoroplastic, preferably polytetrafluoroethylene (PTFE), is produced by annealing the powdered ceramic, for example aluminum oxide, for example corundum, or some other ceramic, at 800° C. This ensures the detachment of any attached hydroxyl groups.

Here too, the description takes polytetrafluoroethylene as an example. This is not to be regarded as a restriction to this material. The statements made above with respect to fluoroplastics apply correspondingly.

In a next step, polytetrafluoroethylene powder and powdered ceramic are mixed at room temperature. The next process step comprises drying the mixture at 100° C. to 150° C. and pressing the dried mixture into the desired shape under pressure of 500 kg/cm$^2$ to 1000 kg/cm$^2$ at room temperature. The pressed blank is sintered for at least five to six hours at 375° C. to 400° C.

If $Al_2O_3$ is used, the powdered material should initially be annealed at about 1250° C., subsequently ground for 12 hours, with the addition of water, at room temperature and then dried for 12 hours at 100° C. to 150° C., before the procedure specified above is commenced.

A composite material in which the proportion of ceramic has a gradient can be produced by means of the described process by producing two or more mixtures with different proportions of ceramic, and layering the mixtures one on top of the other before pressing in such a way that the proportion of ceramic in the composite material decreases from layer to layer.

What is claimed:

1. A process for producing a dielectric component of a filling level measuring device from a composite material including fluoroplastic and ceramic, which comprises the following steps:

a) producing a mixture of powdered ceramic and powdered fluoroplastic;

b) drying the mixture;

c) pressing the mixture;

d) sintering the pressed mixture; and e) forming a dielectric component for a filling level measuring device;

wherein a quotient of a dielectric constant $\epsilon$ of the composite material and a vacuum dielectric constant $\epsilon_0$ has a value between 2 and 10 and wherein the composite material has a loss factor tan δ which is less than one fiftieth.

2. The process as claimed in claim 1, in which a proportion of ceramic in the mixture is below a percolation limit of the composite material.

3. The process as claimed in claim 2, in which at least two mixtures with different proportions of ceramic are produced, and the mixtures are layered one on top of the other before pressing in such a way that the proportion of ceramic in the composite material decreases from layer to layer.

4. The process as claimed in claim 1, in which two or more mixtures with different proportions of ceramic are produced, and the mixtures are layered one on top of the other before pressing in such a way that a proportion of ceramic in the composite material decreases from layer to layer.

5. The process as claimed in claim 1, in which at least two mixtures with different proportions of ceramic are produced, and the mixtures are layered one on top of the other before pressing in such a way that the proportion of ceramic in the composite material decreases from layer to layer.

6. The process as claimed in claim 1, in which the fluoroplastic is polytetrafluoroethylene (PTFE).

* * * * *